United States Patent
Burton et al.

(10) Patent No.: US 9,205,421 B2
(45) Date of Patent: Dec. 8, 2015

(54) ZEOLITE ZSM-18, ITS SYNTHESIS AND ITS USE

(71) Applicant: ExxonMobil Chemical Patents Inc., Baytown, TX (US)

(72) Inventors: Allen W. Burton, Stewartsville, NJ (US); Hilda B. Vroman, Piscataway, NJ (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/391,498

(22) PCT Filed: Apr. 5, 2013

(86) PCT No.: PCT/US2013/035437
§ 371 (c)(1),
(2) Date: Oct. 9, 2014

(87) PCT Pub. No.: WO2013/169419
PCT Pub. Date: Nov. 14, 2013

(65) Prior Publication Data
US 2015/0137392 A1   May 21, 2015

Related U.S. Application Data

(60) Provisional application No. 61/643,955, filed on May 8, 2012.

(51) Int. Cl.
| | |
|---|---|
| B01J 37/08 | (2006.01) |
| B01J 29/70 | (2006.01) |
| C01B 39/48 | (2006.01) |
| B01J 35/00 | (2006.01) |
| B01J 35/02 | (2006.01) |

(52) U.S. Cl.
CPC ............... *B01J 37/082* (2013.01); *B01J 29/70* (2013.01); *B01J 35/002* (2013.01); *B01J 35/023* (2013.01); *C01B 39/48* (2013.01)

(58) Field of Classification Search
CPC ...... B01J 37/082; B01J 35/002; B01J 35/023; B01J 29/70; C01B 39/48
See application file for complete search history.

(56) References Cited

U.S. PATENT DOCUMENTS

| | | |
|---|---|---|
| 3,950,496 A | 4/1976 | Ciric |
| 5,976,491 A | 11/1999 | Vaughan |
| 6,419,895 B1 | 7/2002 | Lewis et al. |
| 7,744,850 B2 | 6/2010 | Miller et al. |
| 8,545,804 B2 * | 10/2013 | Burton et al. ............... 423/700 |
| 2004/0186337 A1 | 9/2004 | Rohde et al. |
| 2005/0095195 A1 | 5/2005 | Lewis et al. |

OTHER PUBLICATIONS

Casci, J.L., "Bis-Quaternary Ammonium Compounds as Templates in the Crystallisation of Zeolites and Silica Molecular Sieves", Studies in Surface Science and Catalysis, Elsevier B.V., vol. 28, Aug. 17, 1986, pp. 215-222.

Lee, S. et al., "Zeolite synthesis in the presence of flexible diquaternary alkylammonium ions $(C_2H_5)_3N+(CH2)_nN+(C_2H_5)_3$ with n=3-10 as structure directing agents", Microporous and Mesoporous Materials, vol. 60, (2003) pp. 237-249.

Moini, A. et al., "The role of diquaternary cations as directing agents in zeolite synthesis". Zeolites, vol. 14, Sep./Oct. 1994, pp. 504-511.

Moini, A. et al., "The Role of Diquatenary Cations as Directing Agents in Zeolite Synthesis", Zeolite and Related Microporous Materials: Status of the Art 1994, Studies in Surface Science and Catalysis, vol. 84, pp. 23-28.

Schmitt, K. et al., "Toward the rational design of zeolite synthesis: the synthesis of zeolite ZSM-18", Zeolites, vol. 14, November/December, pp. 635-642, 1994.

Afeworki, M. et al., "*Synthesis and Structure of ECR-40: An Ordered SAPO Having the MEI Framework*", Studies in Surface Science and Catalysis, Elsevier, vol. 154, pp. 1274-1281 (2004).

Burton, A.W., "*A Priori Phase Prediction of Zeolites: Case Study of the Structure-Directing Effects in the Synthesis of MTT-Type Zeolites*", Journal of the American Chemical Society, 129, pp. 7627-7637 (2007).

Lawton et al., "*The Framework Topology of ZSM-18, a Novel Zeolite Containing Rings of Three (Si,Al)-O Species*", Science, vol. 247, pp. 1319-1322 (1990).

Periodic Table of the Elements, Feb. 4, C&EN, p. 27 (1985).

Wang, G, et al., "*Synthesis, characterization and structure analysis of UZM-22, a MEI-type zeolite framework structure*", Microporous and Mesoporous Materials, 132, pp. 43-53 (2010).

* cited by examiner

*Primary Examiner* — Shailendra Kumar
(74) *Attorney, Agent, or Firm* — Darryl M. Tyus

(57) ABSTRACT

ZSM-18 is synthesized from a mixture comprising water, a source of an oxide of a tetravalent element (Y), a source of an oxide of a trivalent element (X), a source of a first cation Q selected from either butamethonium cations or N,N,N,-trimethyl-N-butylammonium cations and a source of at least one second cation M, wherein the second cation M is selected from lithium, strontium, sodium, tetraalkylammonium and mixtures thereof when the first cation, Q is butamethonium cations, and wherein the second cation M is tetramethylammonium when the first cation Q is N,N,N,-trimethyl-N-butylammonium cations.

17 Claims, 3 Drawing Sheets

ZEOLITE ZSM-18, ITS SYNTHESIS AND ITS USE

CROSS REFERENCE TO RELATED APPLICATIONS

This application is a 371 National Stage Application of International Application PCT/US2013/035437 filed Apr. 5, 2013, which claims the benefits of and priorities to U.S. Ser. No. 61/643,955 filed on May 8, 2012, and EP Application No. 12174341.3 filed on Jun. 29, 2012, the disclosures of which are hereby incorporated by reference herein in their entireties.

FIELD

This invention relates to methods for preparing zeolite ZSM-18 and its use as an adsorbent and a catalyst for organic conversion reactions.

BACKGROUND

Zeolite ZSM-18, the subject matter of U.S. Pat. No. 3,950, 496, is an unusual zeolite first discovered by Julius Ciric at Mobil Oil Corporation in 1975. The entirety of U.S. Pat. No. 3,950,496 is incorporated herein by reference. The framework of ZSM-18 has been assigned the structure designation MEI by the International Zeolite Association Structure Commission and is reported to crystallize within a narrow Si/Al range of between 5.3 and 5.8. Indicated below is the structural formula of the triquatenary ammonium molecule that was first used to prepare zeolite ZSM-18, as disclosed in U.S. Pat. No. 3,950,496:

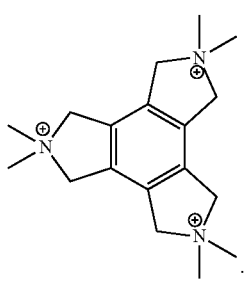

ZSM-18 has a hexagonal crystal structure in which 12-ring pores (6.9 Å in diameter) run parallel to the c-axis and a network of 7-ring pores (3.2 Å×3.5 Å) runs perpendicular to these large pores. In addition, ZSM-18 is unusual in that it includes 3-rings. Thus far, ZSM-18 is the only known aluminosilicate zeolite to possess 3-rings, probably because the bond angles required for 3-rings introduces strain into a siliceous framework. Other zeolite-like structures and known zeolites, such as lovdarite (LOV), nabesite (NAB), OSB-1 (OSO), OSB-2 (OBW), VPI-9 (VNI), VPI-7 (VSV), RUB-17 (RSN), RUB-23, RUB-29, RUB-30, ITQ-33, ITQ-40 and ITQ-44, possess 3-rings, but each of these zeolite-like structures has a substantial incorporation of a framework heteroatom that limits the stability of the zeolite or zeolite-like structure.

In particular, with reference to the above list, LOV, NAB, OSO, and OBW each contain framework beryllium, an element that allows for the narrow T-O-T angles that are generally observed in the 3-rings of zeolites. However, not only are these zeolites unstable toward dehydration and calcination, but the beryllium also presents toxicity issues in their preparation and handling. Furthermore, VNI, VSV and RSN are zincosilicates in which zinc resides in each of the 3-ring subunits; and RUB-23, RUB-29 and RUB-30 are each lithosilicates in which lithium resides in the T sites of the 3-ring units. The remaining ITQ materials are all germanosilicates, which also allow narrow T-O-T angles.

For years ZSM-18 has been considered a canonical example of the templating effects in zeolite synthesis due to the specific selectivity of the triquat used for its synthesis. Kirk Schmitt et al. examined other possible candidates that could be used to template or "structure-direct" ZSM-18 (see Schmitt, Kirk et al., Zeolites 1994, 14, 635) by matching the pseudo-symmetry and dimensions of candidate molecules with those of the zeolite framework. One such candidate is reproduced below:

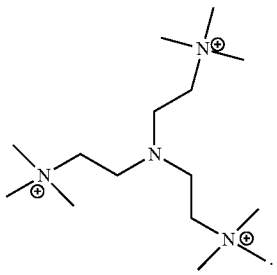

More recently, it has been disclosed that a zeolite designated UZM-22, which is isostructural to ZSM-18, could be produced by the Charge Density Mismatch (CDM) approach with choline as the organic directing agent in conjunction with lithium and/or strontium cations (see U.S. Pat. No. 7,744,850). In the CDM approach to zeolite synthesis, which is disclosed in U.S. Publication No. 2005/0095195, quaternary ammonium hydroxides are normally employed to solubilize the aluminosilicate species in a first step, while crystallization inducing agents such as alkali and alkaline earth metals and more highly charged organoammonium cations are introduced to the synthesis mixture in a separate step. This approach has been used to make zeolite UZM-4 (U.S. Pat. No. 6,419,895), a BPH-type aluminosilicate that is stable to calcination.

According to the present invention, it has now been found that ZSM-18 can be successfully synthesized with butamethonium cations as the organic directing agent in conjunction with at least one cation selected from lithium, tetramethylammonium (TMA), strontium and sodium. In addition, it has been found that ZSM-18 can be synthesized in the presence of a combination of N,N,N,-trimethyl-N-butylammonium and tetramethylammonium cations. Zeolite ZSM-18 prepared by methods of the present disclosure is stable to calcination, and in its calcined form, has a large determined $N_2$ micropore volume of 0.34 cc/g.

SUMMARY

In one aspect, the invention resides in a molecular sieve having the structure of ZSM-18 and comprising butamethonium cations in its pores.

Typically, the molecular sieve has a composition comprising the molar relationship:

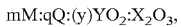

wherein $0<m\leq 2$, $0<q\leq 1.2$, $7\leq y\leq 14$, M comprises a cation selected from the group consisting of lithium, strontium, sodium, tetraalkylammonium and mixtures thereof, Q comprises a butamethonium cation, X is a trivalent element, Y is a tetravalent element, and O is oxygen.

In one embodiment, the tetraalkylammonium cation comprises a tetramethylammonium cation.

In a further aspect, the invention resides in a process for producing a molecular sieve having the structure of ZSM-18, the process comprising:

(i) preparing a synthesis mixture capable of forming said molecular sieve, said synthesis mixture comprising water, a source of an oxide of a tetravalent element (Y), a source of an oxide of a trivalent element (X), a source of a first cation Q selected from the group consisting of either butamethonium cations or N,N,N,-trimethyl-N-butylammonium cations and a source of at least one second cation M of valence n, wherein the second cation M is selected from the group consisting of lithium, strontium, sodium, tetraalkylammonium and mixtures thereof when the first cation Q is butamethonium cations, and wherein the second cation M is tetramethylammonium when the first cation Q is N,N,N,-trimethyl-N-butylammonium cations, and said synthesis mixture having a composition, in terms of mole ratios, within the following ranges:

$YO_2/X_2O_3$ about 6 to about 25;
$nM^{n+}/X_2O_3$ about 0.25 to about 4;
$Q/X_2O_3$ greater than 4; and
$H_2O/YO_2$ about 10 to about 60;

(ii) heating said synthesis mixture under crystallization conditions comprising a temperature of from about 100° C. to about 200° C. and a time from about 1 day to about 21 days until crystals of said molecular sieve are formed; and (iii) recovering said molecular sieve from step (ii).

Conveniently, the tetravalent element Y comprises silicon and the trivalent element X comprises aluminum.

In one embodiment, the second cation M is lithium and $M/X_2O_3$ is about 0.3 to about 2.

In another embodiment, the second cation M is strontium and $2Sr/X_2O_3$ is about 0.3 to about 1.

In yet another embodiment, the second cation M is tetramethylammonium (TMA) and $TMA/X_2O_3$ is about 0.3 to about 4.

In a further embodiment, the second cation M is a mixture of lithium and tetramethylammonium (TMA) and $(Li+TMA)/X_2O_3$ is about 0.3 to about 4.

In yet a further embodiment, the second cation M is a mixture of sodium and strontium and $(Na+2Sr)/X_2O_3$ is about 0.3 to about 2.

Conveniently, the synthesis mixture also contains seeds, preferably of a crystalline material having a MEI framework-type.

In yet a further aspect, the invention resides in a process for converting a feedstock comprising an organic compound to a conversion product which comprises contacting said feedstock at organic compound conversion conditions with a catalyst comprising an active form of the molecular sieve described herein.

DETAILED DESCRIPTION OF THE EMBODIMENTS

Figure 1:
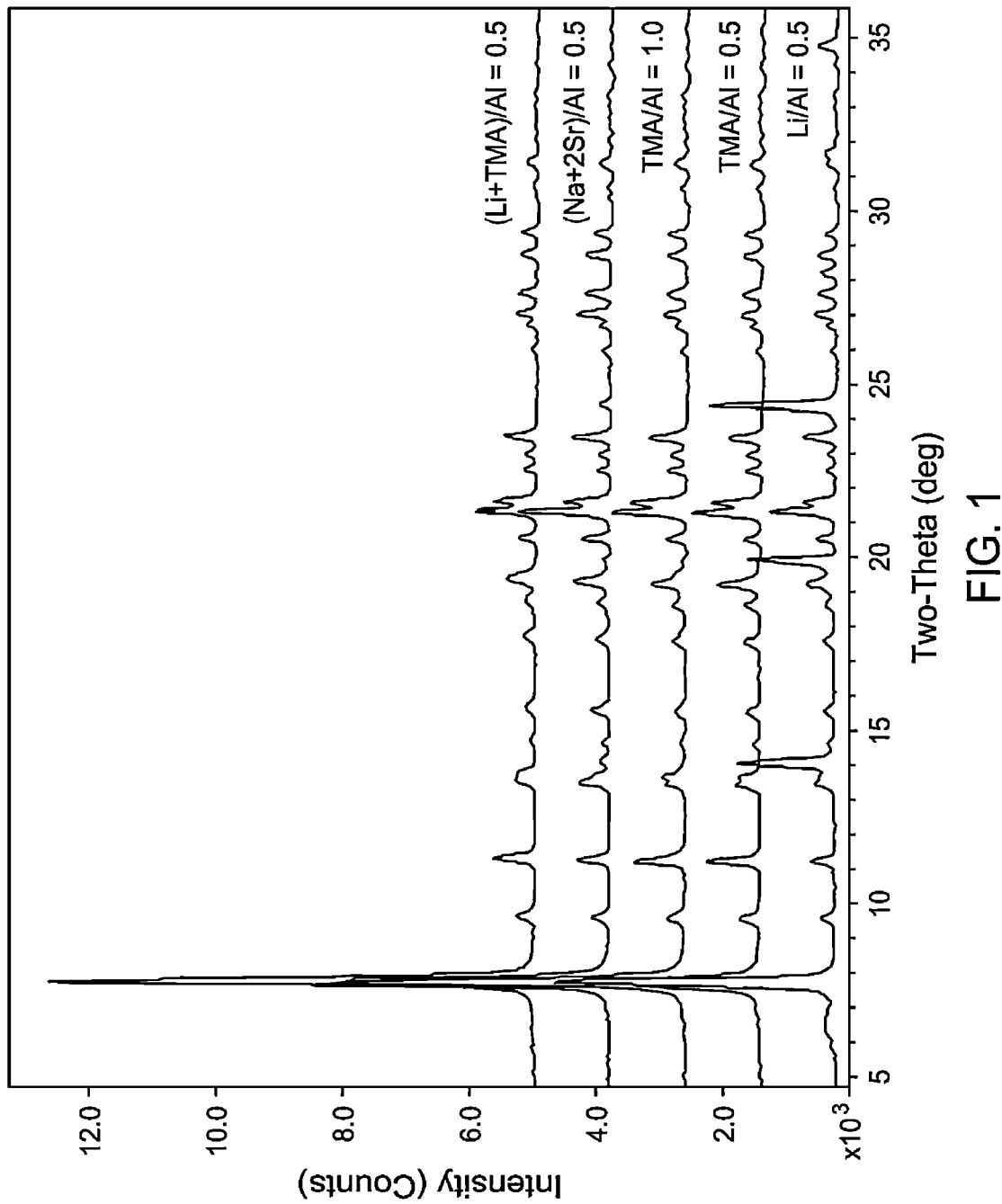
FIG. 1 compares the X-ray diffraction (XRD) patterns of the products of Examples 1 to 5.

Described herein is a process for synthesizing ZSM-18 using novel combinations of structure directing agents, the as-synthesized products of these processes and use of the as-calcined products in adsorption and chemical conversion processes.

In particular, there is described a novel as-synthesized molecular sieve which has the structure of ZSM-18 and which comprises butamethonium cations in its pores. Such a molecular sieve generally has a composition comprising the molar relationship:

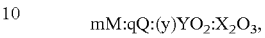

wherein $0<m\leq2$, $0<q\leq1.2$, $7\leq y\leq14$, M comprises a cation selected from the group consisting of lithium, strontium, sodium, tetraalkylammonium and mixtures thereof, Q comprises a butamethonium cation, X is a trivalent element and Y is a tetravalent element, and O is oxygen.

Also described is a process for producing ZSM-18 from a synthesis mixture which comprises water, a source of an oxide of a tetravalent element (Y), such as silicon, a source of an oxide of a trivalent element (X), such as aluminum, a source of a first cation Q selected from the group consisting of either butamethonium cations or N,N,N,-trimethyl-N-butylammonium cations and a source of at least one second cation M of valence n, wherein the second cation M is selected from the group consisting of lithium, strontium, sodium, tetraalkylammonium and mixtures thereof when the first cation Q comprises butamethonium cations, and wherein the second cation M is tetramethylammonium when the first cation Q comprises N,N,N,-trimethyl-N-butylammonium cations.

As used herein, a butamethonium cation is a cation of formula $(CH_3)_3N^+(CH_2)_4N^+(CH_3)_3$ and an N,N,N-trimethyl-N-butylammonium cation is a cation of formula $(CH_3)_3N^+(CH_2)_3CH_3$.

The synthesis mixture is arranged to have a composition, in terms of mole ratios, within the following ranges:

| Reactants | Useful | Preferred |
|---|---|---|
| $YO_2/X_2O_3$ | about 6 to about 25 | about 8 to about 20 |
| $nM^{n+}/X_2O_3$ | about 0.25 to about 4 | about 0.5 to about 2.5 |
| $Q/X_2O_3$ | greater than 4 | about 5 to about 20 |
| $H_2O/YO_2$ | about 10 to about 60 | about 15 to about 40. |

In one embodiment, when the first cation Q comprises butamethonium cations, the second cation M is lithium and $M/X_2O_3$ is about 0.3 to about 2.

In a further embodiment, when the first cation Q comprises butamethonium cations, the second cation M is strontium and $2Sr/X_2O_3$ is about 0.3 to about 1.

In another embodiment, when the first cation Q comprises butamethonium cations, the second cation M is tetramethylammonium (TMA) and $TMA/X_2O_3$ is about 0.3 to about 4.

In yet another embodiment, when the first cation Q comprises butamethonium cations, the second cation M is a mixture of lithium and tetramethylammonium (TMA) and $(Li+TMA)/X_2O_3$ is about 0.3 to about 4.

In still another embodiment, when the first cation Q comprises butamethonium cations, the second cation M is a mixture of sodium and strontium and $(Na+2Sr^{2+})/X_2O_3$ is about 0.3 to about 2.

In still a further embodiment, when the first cation Q comprises butamethonium cations, the second cation M is a mixture of tetramethylammonium (TMA) and strontium and $(TMA+2Sr^{2+})/X_2O_3$ is about 0.3 to about 2.

Suitable sources of tetravalent element Y depend on the element Y that is selected. In embodiments where Y is silicon, suitable sources of silicon include colloidal suspensions of silica, precipitated silica alkali metal silicates, and tetraalkyl orthosilicates.

Suitable sources of trivalent element X also depend on the element X that is selected. In embodiments where X is aluminum, sources of aluminum include hydrated alumina, fumed alumina and water-soluble aluminum salts, such as aluminum nitrate.

Combined sources of two or more of the components M, X and Y can also be used, such as sodium aluminate and metakaolin.

Crystallization of ZSM-18 can be carried out at either static or stirred conditions in a suitable reactor vessel, such as for example, polypropylene jars or Teflon lined or stainless steel autoclaves, at a temperature of about 100° C. to about 200° C., such as about 150° C. to about 170° C., for a time sufficient for crystallization to occur at the temperature used, e.g., from about 1 day to about 21 days, for example about 2 days to about 14 days. Thereafter, the synthesized crystals are separated from the liquid and recovered.

The synthesis may be aided by seeds from a previous synthesis of ZSM-18, with the seeds suitably being present in an amount from about 0.01 ppm by weight to about 10,000 ppm by weight, such as from about 100 ppm by weight to about 5,000 ppm by weight of the synthesis mixture.

To the extent desired and depending on the $X_2O_3/YO_2$ molar ratio of the material, any cations in the as-synthesized ZSM-18 can be replaced in accordance with techniques well known in the art by ion exchange with other cations. Preferred replacing cations include metal ions, hydrogen ions, hydrogen precursor, e.g., ammonium ions and mixtures thereof. Particularly preferred cations are those which tailor the catalytic activity for certain hydrocarbon conversion reactions. These include hydrogen, rare earth metals and metals of Groups 2 to 15 of the Periodic Table of the Elements. As used herein, the numbering scheme for the Periodic Table Groups is as disclosed in Chemical and Engineering News, 63(5), 27 (1985).

The molecular sieve described herein may be subjected to treatment to remove a portion or the entire organic directing agents Q and M, where M is tetramethylammonium, used in its synthesis. This is conveniently affected by thermal treatment in which the as-synthesized material is heated at a temperature of at least about 370° C. for at least 1 minute and generally not longer than 20 hours. While subatmospheric pressure can be employed for the thermal treatment, atmospheric pressure is desired for reasons of convenience. The thermal treatment can be performed at a temperature up to about 925° C. The thermally treated product, especially in its metal, hydrogen and ammonium forms, is particularly useful in the catalysis of certain organic, e.g., hydrocarbon, conversion reactions.

The molecular sieve described herein may be intimately combined with a hydrogenating component, such as molybdenum, rhenium, nickel, cobalt, chromium, manganese, or a noble metal such as platinum or palladium where a hydrogenation-dehydrogenation function is to be performed. Such component can be in the composition by way of cocrystallization, exchanged into the composition to the extent a Group IIIA element, e.g., aluminum, is in the structure, impregnated therein or intimately physically admixed therewith. Such component can be impregnated in or on to it such as, for example, by, in the case of platinum, treating the silicate with a solution containing a platinum metal-containing ion. Thus, suitable platinum compounds for this purpose include chloroplatinic acid, platinous chloride and various compounds containing the platinum amine complex.

The ZSM-18 produced by the present process, when employed either as an adsorbent or as a catalyst should be dehydrated, at least partially. This can be done by heating to a temperature in the range of about 100° C. to about 500° C., such as about 200° C. to about 370° C. in an atmosphere such as air, nitrogen, etc., and at atmospheric, subatmospheric or superatmospheric pressures for between 30 minutes and 48 hours. Dehydration can also be performed at room temperature merely by placing the ZSM-18 in a vacuum, but a longer time is required to obtain a sufficient amount of dehydration.

The ZSM-18 described herein may be used as an adsorbent or, particularly in its aluminosilicate form, as a catalyst to catalyze a wide variety of organic compound conversion processes including many of present commercial/industrial importance. Examples of chemical conversion processes which are effectively catalyzed by the crystalline material of this invention, by itself or in combination with one or more other catalytically active substances including other crystalline catalysts, include those requiring a catalyst with acid activity. Examples of organic conversion processes which may be catalyzed by ZSM-18 include cracking, hydrocracking, disproportionation, alkylation, and isomerization.

As in the case of many catalysts, it may be desirable to incorporate the ZSM-18 described herein with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with ZSM-18, i.e., combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained in an economic and orderly manner without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with ZSM-18 include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with ZSM-18 also include inorganic oxides, such as silica, zirconia, titania, magnesia, beryllia, alumina, and mixtures thereof In addition to the foregoing materials, ZSM-18 can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia, and silica-magnesia-zirconia.

The relative proportions of ZSM-18 and inorganic oxide matrix may vary widely, with the ZSM-18 content ranging from about 1 to about 90 percent by weight and more usually, particularly when the composite is prepared in the form of beads, in the range of about 2 to about 80 weight percent of the composite.

The invention will now be more particularly described with reference to the Examples and the accompanying drawings.

EXAMPLES 1 to 5

A solution was prepared by dissolving 3.90 g Alcoa C-31 alumina trihydrate in 121.5 g of an aqueous solution of butamethonium hydroxide (20.69%). To dissolve the alumina, it was necessary to heat the suspension (overnight in a steambox at 98° C.). Then 56.4 g Ludox AS-30 (30% silica) was mixed into the aluminum solution to create a uniform, translucent suspension with a calculated silica/alumina molar ratio of about 11.3. 0.4-0.5 g of the suspension were then added to stainless steel 1-cc wells. Aliquots of 5% lithium nitrate, 15% sodium nitrate, 15% strontium nitrate, or 15% tetramethylammonium chloride solutions were added to the wells and mixed to create suspensions with the molar ratios shown in Table 1. After being sealed within the stainless steel liners, the gels were heated for 21 days under tumbling conditions at 150° C. The solids were isolated by a series of three centrifugations, decantations of the supernatant liquid, and re-suspensions in deionized water. After the last decantation of supernatant liquid, the solids were dried under atmospheric conditions. FIG. 1 shows the powder XRD patterns for each of the Examples. Note that each experiment gave pure ZSM-18 products except for Example 1, the product of which also contained a minor sodalite impurity and a trace quantity of a layered impurity.

TABLE 1

| Example | Li/Al$_2$O$_3$ | TMA/Al$_2$O$_3$ | 2Sr/Al$_2$O$_3$ | Na/Al$_2$O$_3$ | Phases |
|---|---|---|---|---|---|
| 1 | 1 | 0 | 0 | 0 | ZSM-18, minor amount of sodalite |
| 2 | 0 | 1 | 0 | 0 | ZSM-18 |
| 3 | 0 | 2 | 0 | 0 | ZSM-18 |
| 4 | 0 | 0 | 0.5 | 0.5 | ZSM-18 |
| 5 | 0.5 | 0.5 | 0 | 0 | ZSM-18 |

EXAMPLES 6 to 10

A solution was prepared by dissolving 0.94 g Catapal B alumina in 75.59 g butamethonium dihydroxide solution ([OH]=1.83 mmol/g) and 45 g deionized water. To dissolve the alumina, it was necessary to heat the suspension (overnight in a steambox at 98° C.). Then 20.70 g Ludox AS-40 (40% silica) was mixed into the aluminum solution to create a uniform translucent suspension with a calculated silica/alumina molar ratio of about 20. 0.4-0.5 g of the suspension were then added to stainless steel 1-cc wells. Aliquots of 15% sodium nitrate, 15% strontium nitrate, or 15% tetramethylammonium chloride solutions were added to the wells to create suspensions with the molar ratios shown in Table 2. After being sealed within the stainless steel liners, the gels were heated for 10 days under tumbling conditions at 125° C. Table 2 shows that each preparation produced pure ZSM-18.

TABLE 2

| Example | Li/Al$_2$O$_3$ | TMA/Al$_2$O$_3$ | 2Sr/Al$_2$O$_3$ | Na/Al$_2$O$_3$ | Phases |
|---|---|---|---|---|---|
| 6 | 0 | 0.5 | 0.5 | 0 | ZSM-18 |
| 7 | 0 | 0.5 | 0 | 0.5 | ZSM-18 |
| 8 | 0 | 0 | 1 | 1 | ZSM-18 |
| 9 | 0 | 0 | 0 | 1 | ZSM-18 |
| 10 | 0 | 1 | 0 | 1 | ZSM-18 |

EXAMPLES 11 and 12

A solution was prepared by dissolving 1.56 g Catapal B alumina in 170 g N,N,N-trimethyl-N-butylammonium hydroxide solution ([OH]=1.35 mmol/g). To dissolve the alumina, it was necessary to heat the suspension (overnight in a steambox at 98° C.). Then 34.43 g Ludox AS-40 (40% silica) was mixed into the aluminum solution to create a uniform translucent suspension. 0.4-0.5 g of the suspension were then added to stainless steel 1-cc wells. Aliquots of 15% tetramethylammonium chloride solutions were added to create suspensions with molar TMA/Al$_2$O$_3$ ratios of 1 and 2. After being sealed within the stainless steel liners, the gels were heated for 10 days under tumbling conditions at 125° C. Both preparations produced pure ZSM-18.

EXAMPLE 13

Figure 2:
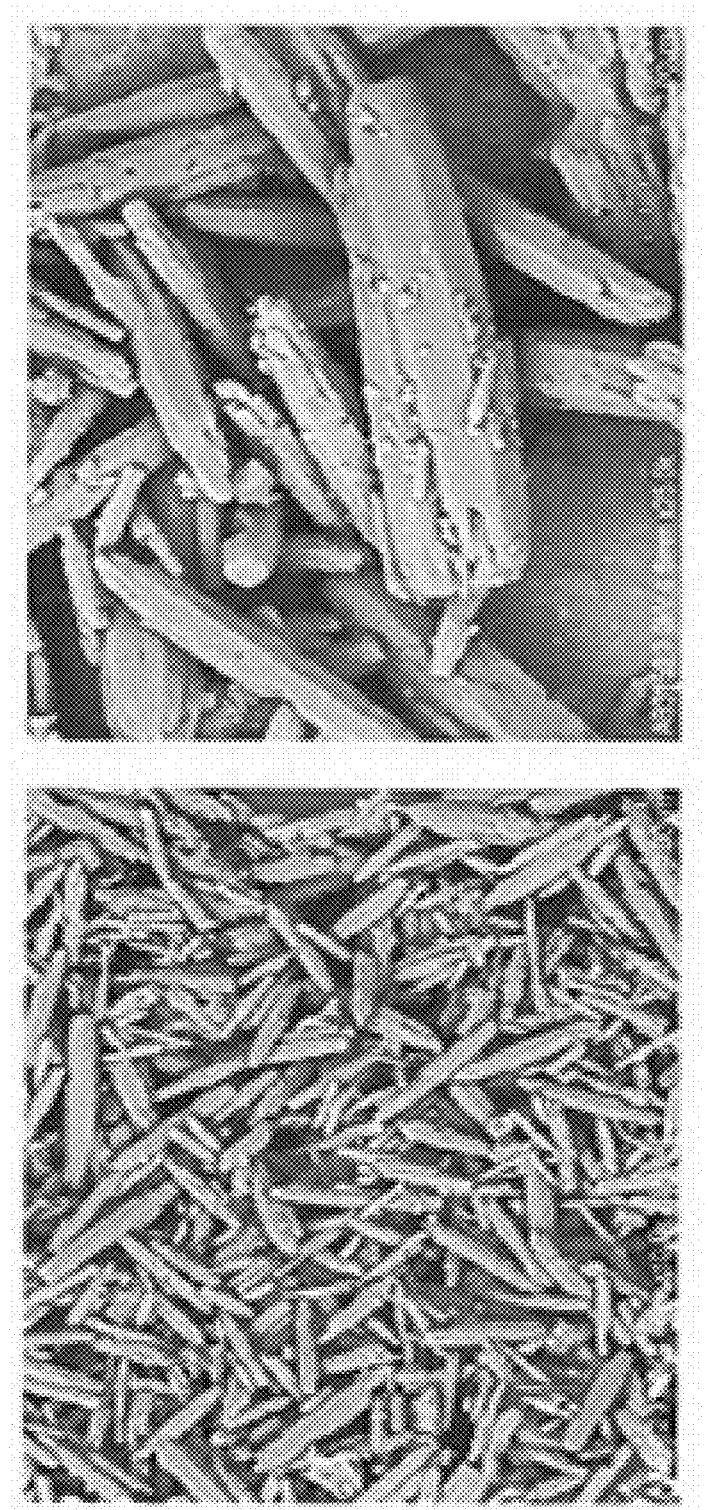
FIG. 2 shows scanning electron microscope (SEM) images of the product of Example 13.

The procedure of Example 5 was repeated on a larger scale in that 13.0 g of the parent aluminosilicate suspension used in Example 5 were added to a 23-mL Teflon insert for a stainless steel Parr autoclave. 0.062 g solid lithium nitrate and 0.10 g solid tetramethylammonium chloride were added to the mixture and mixed using magnetic stirring for 15 minutes to create a uniform suspension. The liner was then capped, sealed inside the 23-mL autoclave, and heated at 150° C. under tumbling conditions (~50 rpm) inside a convection oven for 14 days. After the reactor cooled to ambient conditions, the solid products were then isolated by filtering through a Buchner funnel, washing with about 200 mL deionized water, and drying in an oven at 100° C. Powder XRD showed the product to be ZSM-18 with a trace sodalite impurity. FIG. 2 shows SEM images of the product. The measured silica/alumina molar ratio of the product was 11 (5.29 wt. % Al, 30.2 wt. % Si, 11.5 wt. % C, 3.35 wt. % H, 2.93 wt. % N).

The product was heated inside a muffle furnace from ambient temperature to 400° C. at 4° C./min under a nitrogen atmosphere, then heated to 520° C. at 4° C./min in air, and maintained at 520° C. in air for 2 hours. The calcined product was then measured with nitrogen physisorption and the data were analyzed by the t-plot method. The determined micropore volume was 0.34 cc/g.

EXAMPLE 14

The process of Example 13 was repeated except 0.05 g seeds from that Example were added to the synthesis mixture and the reaction was heated only for 5 days at 150° C. Powder XRD showed the product to be ZSM-18 with a minor amount of sodalite.

EXAMPLE 15

13.0 g of the parent aluminosilicate suspension used in Examples 1-5 were added to a 23-mL Teflon insert for a stainless steel Parr autoclave. 0.20 g solid tetramethylammonium chloride (TMA/Al$_2$O$_3$=1.09 molar) were added to the mixture and blended using magnetic stirring for 15 minutes to create a uniform suspension. 0.05 g seeds from Example 11 were added. The liner was then capped, sealed inside the 23-mL autoclave, and heated at 150° C. under tumbling conditions (~50 rpm) inside a convection oven for 5 days. After the reactor cooled to ambient conditions, the solid products were then isolated by filtering through a Buchner funnel, washing with about 200 mL deionized water, and drying in an oven at 100° C. Powder XRD showed the product to be pure ZSM-18.

EXAMPLE 16

Example 15 was repeated except 0.19 g strontium nitrate was used in place of the 0.20 g tetramethylammonium chloride. The product was worked up after 5 days. Powder XRD showed the product to be pure ZSM-18.

EXAMPLE 17

A solution was created by dissolving 3.92 g Alcoa C-31 alumina trihydrate in 178.3 g of an 18.8% aqueous solution of butamethonium hydroxide in a polypropylene bottle. 40.73 g Ludox AS-40 (40% silica) was then added and mixed to create a uniform suspension. To a 142.6 g portion of this suspension was added 1.76 g tetramethylammonium chloride (TMA/Al$_2$O$_3$=1.0), which was blended into the mixture under magnetic stirring for 20 minutes to create a uniform suspension. 0.50 g ZSM-18 seeds from Example 16 were then added and the gel was then sealed inside a 300 mL stainless steel Parr autoclave equipped with an overhead stirrer. The gel was then heated at 150° C. at 150 rpm for 11 days. The solid products were then isolated by filtering through a Buchner funnel, washing with about 750 mL deionized water, and drying in an oven at 100° C. The total yield of solid product was 12.6 g. Powder XRD showed the product to be pure ZSM-18. The measured silica/alumina molar ratio of the product was 10.04.

EXAMPLE 18

A solution was created by dissolving 3.01 g Alcoa C-31 alumina trihydrate in 193.5 g of an 20.69% aqueous solution of butamethonium hydroxide in a polypropylene bottle. 57.84 g Ludox AS-40 (40% silica) was then added and mixed to create a uniform suspension. To 10.0 g of the above suspension was added 0.43 g of a 15% sodium nitrate aqueous solution. The mixture was homogenized under magnetic stirring for 15 minutes. 0.02 g ZSM-18 seeds were added to the gel. The liner was then capped, sealed inside the 23-mL autoclave, and heated inside a convection oven at 100° C. for 10 days and then at 125° C. for an additional 6 days under tumbling conditions (~50 rpm). After the reactor cooled to ambient conditions, the solid products were then isolated by a series of three centrifugations, decantings, and re-suspensions. The solids were then dried in an oven at 100° C. Powder XRD showed the product to be pure ZSM-18.

EXAMPLE 19

Example 18 was repeated except 0.083 g tetramethylammonium chloride was used in addition to the 0.43 g 15% sodium nitrate aqueous solution. Powder XRD showed the solid product to be ZSM-18.

EXAMPLE 20

Experiment 18 was repeated except 0.54 g 15% strontium nitrate solution was used in addition to the 0.43 g 15% sodium nitrate aqueous solution. Powder XRD showed the solid product to be ZSM-18.

EXAMPLE 21

Example 19 was repeated except only 0.22 g 15% sodium nitrate and 0.042 g tetramethylammonium chloride were used. Powder XRD showed the solid product to be ZSM-18.

EXAMPLE 22

Figure 3:
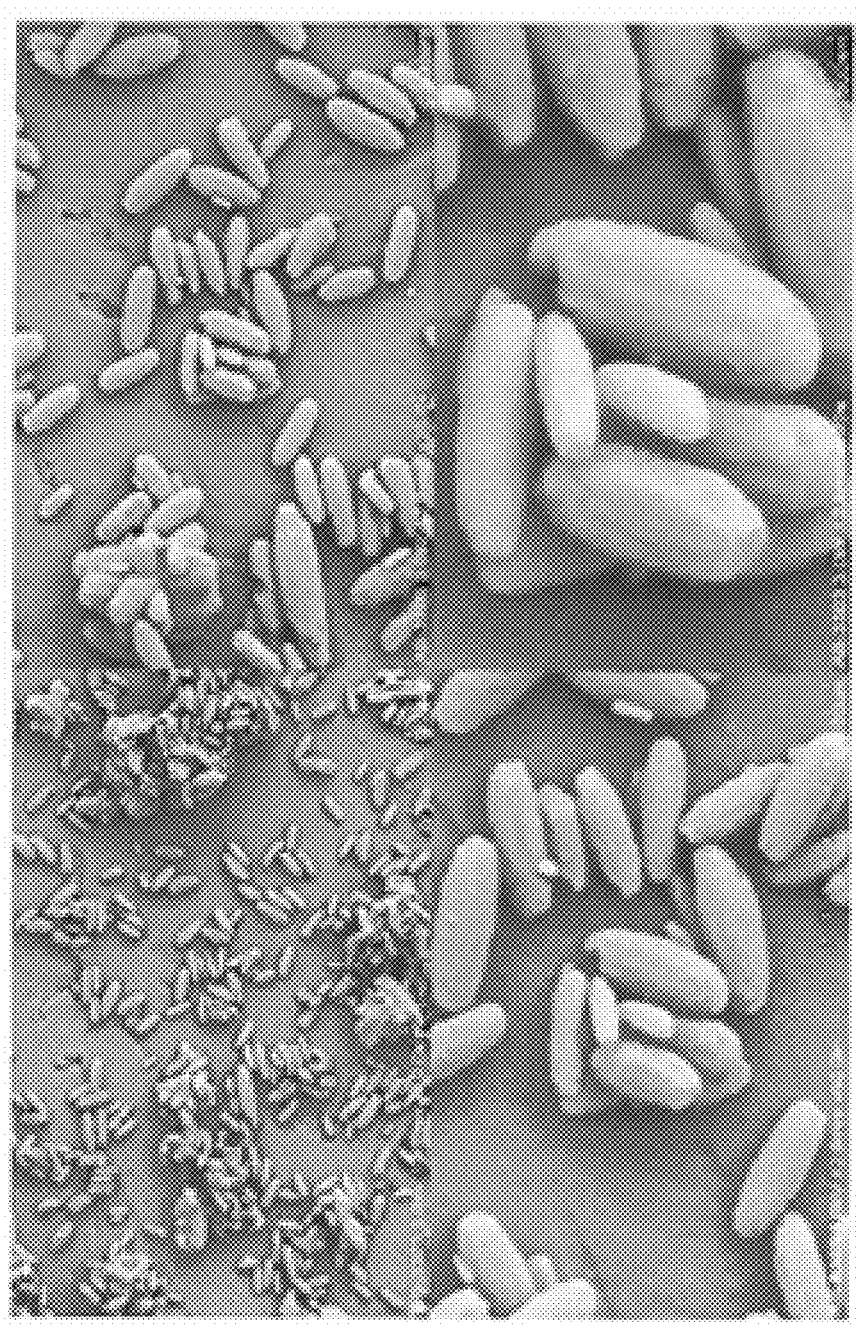
FIG. 3 shows SEM images of the product of Example 22.

Example 18 was repeated except 0.27 g 15% strontium nitrate and 0.042 g tetramethylammonium chloride were used in place of the sodium nitrate. Powder XRD showed the solid product to be ZSM-18. FIG. 3 shows SEM images of the product.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise whenever a composition, an element or a group of elements is preceded with the transitional phrase "comprising", it is understood that we also contemplate the same composition or group of elements with transitional phrases "consisting essentially of", "consisting of", "selected from the group of consisting of", or "is" preceding the recitation of the composition, element, or elements and vice versa.

The invention claimed is:

1. A molecular sieve comprising cations of formula $(CH_3)_3N^+(CH_2)_4N^1(CH_3)_3$ in its pores and having the structure of ZSM-18 and a composition comprising the molar relationship:

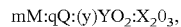

mM:qQ:(y)YO$_2$:X$_2$O$_3$, wherein 0<m<2, 0<q<1.2, 7<y<14, M comprises a cation selected from the group consisting of lithium, strontium, sodium, tetraalkylammonium and mixtures thereof, Q comprises a butamethonium cation, X is a trivalent element and Y is a tetravalent element.

2. The molecular sieve of claim 1, wherein said tetraalkylammonium cation comprises a tetramethylammonium cation.

3. The molecular sieve of claim 1, having in its calcined form an N$_2$ micropore volume of 0.34(±0.04) cc/g.

4. A process for producing a molecular sieve having the structure of ZSM18, the process comprising the steps of:
(i) preparing a synthesis mixture capable of forming said molecular sieve, said synthesis mixture comprising water, a source of an oxide of a tetravalent element (Y), a source of an oxide of a trivalent element (X), a source of a first cation Q selected from the group consisting of either cations of formula $(CH_3)_3N^+(CH_2)_4N^+(CH_3)_3$ or N,N,N,-trimethyl-N-butylammonium cations and a source of at least one second cation M of valence n, wherein the second cation M is selected from the group consisting of lithium, strontium, sodium, tetraalkylammonium and mixtures thereof when said first cation Q is a cation of formula $(CH_3)_3N^+(CH_2)_4N^+(CH_3)_3$, and wherein said second cation M is tetramethylammonium when said first cation Q is N,N,N,trimethyl-N-butylammonium cations, and said synthesis mixture having a composition, in terms of mole ratios, within the following ranges:

$YO_2/X_2O_3$ about 6 to about 25;
$(nM^{n+})/X_2O_3$ about 0.25 to about 4;
$Q/X_2O_3$ greater than 4; and
$H_2O/YO_2$ about 10 to about 60;

(ii) heating said synthesis mixture under crystallization conditions comprising a temperature of from about 100° C. to about 200° C. and a time from about 1 day to about 21 days until crystals of said molecular sieve are formed; and (iii) recovering said molecular sieve from step (ii).

5. The process of claim 4, wherein said tetravalent element Y comprises silicon and said trivalent element X comprises aluminum.

6. The process of claim 4, wherein said first cation Q comprises cations of formula $(CH_3)_3N^+(CH_2)_4N^+(CH_3)_3$.

7. The process of claim 6, wherein said second cation M is lithium and $Li^+/X_2O_3$ is about 0.3 to about 2.

8. The process of claim 6, wherein said second cation M is strontium and $2Sr^{2+}/X_2O_3$ is about 0.3 to about 1.

9. The process of claim 6, wherein said second cation M is tetramethylammonium (TMA) and $TMA^+/X_2O_3$ is about 0.3 to about 4.

10. The process of claim 6, wherein said second cation M is a mixture of lithium and tetramethylammonium (TMA) and $(Li^++TMA^+)/X_2O_3$ is about 0.3 to about 4.

11. The process of claim 6, wherein said second cation M is a mixture of sodium and strontium and $(Na^++2Sr^{2+})/X_2O_3$ is about 0.3 to about 2.

12. The process of claim 6, wherein said second cation M is a mixture of tetramethylammonium (TMA) and strontium and $(TMA^++2Sr^{2+})/X_2O_3$ is about 0.3 to about 2.

13. The process of claim 4, wherein said synthesis mixture also contains seeds.

14. The process of claim 4, wherein said synthesis mixture further comprises from about 0.01 ppm by weight to about 10,000 ppm by weight of seeds.

15. The process of claim 4, wherein said synthesis mixture further comprises from about 100 ppm by weight to about 5,000 by weight of seeds.

16. The process of claim 4 wherein said seeds comprise a crystalline material having a MEI framework-type.

17. The molecular sieve of claim 1, having in its calcined form an $N_2$ micropore volume of 0.34 (±0.04) cc/g.

* * * * *